United States Patent Office 3,100,264
Patented Aug. 6, 1963

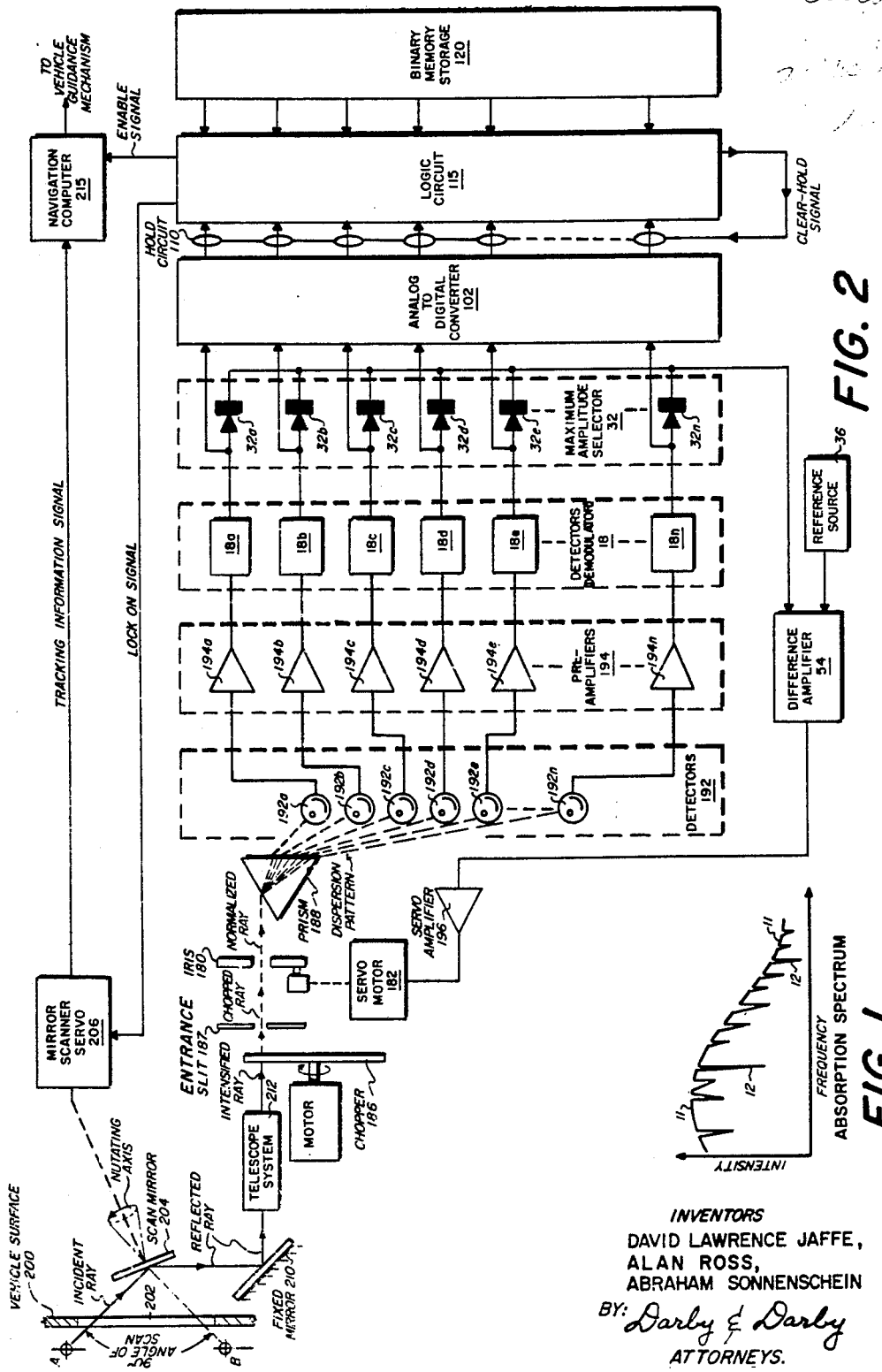

3,100,264
STAR ENERGY IDENTIFICATION SYSTEM FOR SPACE NAVIGATION
David Lawrence Jaffe, Great Neck, and Alan Ross and Abraham Sonnenschein, Bayside, N.Y., assignors to Polarad Electronics Corporation, Long Island City, N.Y., a corporation of New York
Filed Jan. 28, 1960, Ser. No. 5,271
17 Claims. (Cl. 250—203)

This invention relates to flight-navigational systems, and more particularly to a system for the identification of and navigation to stars or other interplanetary bodies.

When a space vehicle is traveling in outer space, it is necessary that the vehicle be able to rapidly and accurately identify its target destination. The vehicle must also be guided toward the target over the shortest possible flight path. In other words, the space vehicle's navigational system must have extremely rapid response and also be very accurate. One obvious reason for these requirements is that the space vehicle has a limited amount of fuel for flight purposes. Therefore, a slowly acting navigational system or any errors introduced by the system would be costly and perhaps cause the loss of the vehicle.

In many cases, a vehicle's flight plan calls for the identification of a particular star, or other interplanetary body either for target and/or navigational fix purposes. Even today there are many stars, recognizable by the naked eye of an observer on earth, which are of great importance for navigational purposes. In outer space flights, there are many other stars which are not recognizable and identifiable by the eye, which are also very important for target and/or navigational purposes. The word "star" is used here and in the remainder of this description and appended claims to denote stars, planets, meteors, and other types of interplanetary bodies.

When an observer on the earth first sought to identify a particular star, he did so by using the shape and position of an associated constellation as a guide for fixing the star in its particular frame of reference. This could be done because stars are visible as points of light, due to the light energy which they radiate, and each star has a fixed position with respect to a group of stars.

As the science of astronomy advanced, and more and more stars were investigated, it became necessary to establish further criteria for identifying particular stars. Another way of identifying a star, in addition to its position in a particular constellation, is to note its apparent magnitude of brightness. Some stars appear very bright to the unaided eye, while others appear quite dim. Therefore, a magnitude of brightness table was compiled to aid the observer in identifying particular stars.

Since there are many stars which lie very close together, as for example in the neighborhood of the Milky Way, the geometrical location and apparent brightness are not sufficient in themselves to enable an observer on earth to identify a particular star. This is true because many stars appear to be equally bright and lie relatively close together in a group in the same general direction in space. Therefore, a third characteristic of stars was evolved to further aid in the identification process. This third characteristic is the color of particular stars. Since the surface temperature ranges of stars vary over thousands of degrees, the colors of the light which they radiate are not all the same. For example, the "cold" stars like Betelgeuse, are reddish in color. As the temperature of the star increases, the radiated light gets more orange in color. If the temperature of the star is as hot as the temperature of the earth's sun, its radiated light appears yellowish. The very hottest stars, for example like Riegel, are blue-white.

Utilizing the three characteristics of geometrical position, brightness and color, the eye of an observer combines this data into a single impression in order to identify the star. This impression is formed in essence by a signal from a given direction in space, signifying the position of the particular star; the signal has a given amplitude, representative of the magnitude of brightness of the star; and the signal also has a spectral distribution in the visible frequency range that has maximum intensity at a frequency representative of one particular color. This signal reaches the eye of the observer and is translated in his sensory organs to identify a particular star.

As long as the observer is on the earth, he does not have to concern himself with all of the vast accumulation of stars in order to be able to orient himself with respect to a particular star in the sky. Actually, the earth observer cannot see most of the stars in the solar system because the atmosphere surrounding the earth cuts down the light radiated by the fainter stars. For example, the unaided eye cannot see the individual stars in the galaxy called the "Milky Way."

Therefore, with the naked eye alone, it is impossible for the observer to identify many of the stars in the solar system.

This is true because the eye of an observer is not always sensitive enough to analyze the light signal from a particular star with sufficient accuracy to distinguish it between several stars that might look similar. Therefore, it becomes necessary to utilize instruments such as telescopes to help the observer in the identification of stars. Such devices are well known and no further description is deemed necessary here.

Instruments based on devices such as dispersion prisms and optical diffraction gratings have also been utilized to aid in the identification of stars. These instruments take the light signal received from a particular body and resolve it into its component frequencies. As is well known, the signal from a particular star or other light radiating body has certain distinguishing characteristics and a different spectrum is emitted by every body, due to the particular nature of the material which forms it. The resultant output of the prism or diffraction grating shows the relationship between the wavelengths of the spectral components forming the signal.

To illustrate the phenomenon of different light signals being radiated from different bodies, consider that a hot solid body, such as the incandescent filament of an electric light bulb, emits a continuous spectrum in which the colors vary continuously, without a break, from red to violet. As another example, the coating of the interior of a fluorescent bulb emits a spectrum consisting of a series of sharp lines which are characteristic of the elements of which the coating material is formed. An object like a star, which has a very hot interior and a comparatively cold atmosphere, emits what is called an absorption spectrum. The absorption spectrum consists of a bright continuous background spectrum, such as we get from a hot solid body, on which is interspersed sharp dark lines which are characteristic of the atoms in the cold atmosphere of the star.

The spectra of stars referred to above are usually formed by optical prisms or gratings and are imaged on photographic films or plates to record and identify the spectral characteristics of the stars. Such a technique is unsatisfactory in many ways since it is time consuming to expose and develop a particular photographic plate. Furthermore, even after the photograph has been made, a trained person must be able to make the recognition of the spectrum lines in order to identify the star. Additionally, the use of the photographic technique does nothing to solve navigational problems which a space vehicle encounters or to provide any information to the vehicle's flight guidance system. It should also be realized that once the observer moves from earth into outer space, he loses his frame of reference and cannot properly orient himself with respect to a particular star.

As has been explained above, every interplanetary body emits a unique form of radiant energy light spectrum due to its physical composition. This radiant energy, when resolved by suitable means, can be formed into an amplitude-frequency spectrum. By properly identifying the amplitude-frequency spectrum, it is possible to identify the source from which it originated.

The present invention is directed toward a system which is capable of automatically identifying a star or other interplanetary body and also for using the star to provide navigational information to the guidance system of a space vehicle. In operation, the system of the present invention receives light energy from an interplanetary body and converts the light energy from a particular body into its unique, characteristic amplitude-frequency absorption spectrum having the characteristic spectral lines. This spectrum is then normalized in amplitude to a predetermined reference level by normalizing the amplitude of the signal applied to the system. The spectral lines in the spectrum, having been normalized in amplitude to a reference level, are then converted into a digital number. This digital number is then compared in a computer storage memory with a number of reference numbers which have previously been formed for a plurality of bodies. When a comparison is effected between the signal received and one of the numbers stored in the computer memory, the star which radiated the incoming signal energy is identified. The information provided by the identification is then utilized for navigational and/or steering purposes for the space vehicle.

It is therefore an object of this invention to provide a system for automatically identifying stars or other interplanetary bodies.

Another object of this invention is to provide a system for navigating to stars or other interplanetary bodies.

Still a further object of this invention is to provide a system for navigating toward stars or other interplanetary bodies by the recognition of such bodies.

Another object of this invention is to provide a system for the automatic recognition of the stars and for navigating a space vehicle toward the particular star.

Other objects and advantages of the present invention will become more apparent upon consideration of the following specification and annexed drawings, in which:

FIGURE 1 is the graph of a typical absorption spectrum for a star; and

FIGURE 2 is a schematic diagram of the system.

Mathematical expressions have been derived for various spectra which are emitted by certain bodies. The mathematical expressions for such curves were first derived by Planck on the basis of his quantum theory. These curves are actually a series of bright line spectra which consist of a series of sharp peaks each of which represents a line in the spectrum, the particular type of spectrum formed being dependent primarily on the nature of the body. In the case of stars, an absorption type of spectrum is produced. A typical absorption spectrum is shown in FIG. 1 and it is seen to be a continuous curve 11 similar to a Planckian distribution plus sharp minima 12 representing the absorption lines. The frequency of the radiant energy is shown along the abscissa of the graph, while the intensity or amplitude is shown along the ordinate.

Although the spectra of stars fall into broad classes, with all of the stars that belong to the same class having similar features, no two stars, even though they may belong to the same spectral class, have identical spectral characteristics. Each star has its own characteristic absorption spectrum. Each of the spectral lines in the absorption spectrum which emanates from a star lies at a particular frequency, with respect to the overal range of the spectrum, and also has a particular amplitude in accordance with the physical composition of the star. For example, in the spectrum of a star like Riegel, a blue-white star, lines of neutral helium are most intense and pronounced. In the case of a white star, such as Sirius, the spectrum is characterized by strong lines of hydrogen, while the lines of neutral helium are not nearly as intense as in the case of Riegel. The spectrum of a yellow star, like the sun, is rich in the lines of neutral metals, like iron and calcium. Each of the other stars also has a unique, characteristic amplitude-frequency spectrum. The identification of various stars by their characteristic spectrum can therefore be used for navigational and steering purposes on a space vehicle.

The operation of the system of the present invention is explained by referring to FIGURE 2. In FIGURE 2, the portion of the system used for resolving the light radiated from a star into its characteristic amplitude-frequency spectrum is shown mounted within the surface 200 of a space vehicle. The surface 200 has an aperture cut therein in which is mounted a light transparent plate 202 which maintains the aerodynamic surface of the vehicle and also keeps a tight seal therewith. Any suitable materials may be utilized for the surface 200 and the light transparent plate 202. Such materials are well known in the art and since they form no part of the present invention, no further description is necessary.

Located within the vehicle adjacent the transparent plate 202 is a mirror 204 which is made to scan by a mirror scanner servo system 206. The mirror 204 picks up the radiant light energy emitted from the stars and conveys it to the rest of the system. The mirror scanner servo system 206 is a suitable servomechanism drive which is coupled to the mirror 204. In a preferred form of the invention, the mirror scanner servo 206 nutates the mirror 204 about an axis through its center in an increasing spiral search pattern. A suitable servo system that may be used for controlling the scanning of the mirror is shown and described at page 337 of Principles of Radar, by Reintjes and Coate, published by McGraw-Hill Co., 1952. In the system described in that book, a mirror is substituted for the radar antenna and the system operates as otherwise described. The search pattern of the mirror 204 preferably covers a solid conical volume between points A and B having a 90-degree vertex angle. This allows approximately ¼ of the entire sky to be scanned by the mirror.

The light incident on the scanning mirror 204 is reflected to a stationary mirror 210 which focuses the incident light to a suitable telescope system 212 which intensifies and concentrates the incident light energy. In a preferred embodiment of the invention; a Schmidt type telescope system is utilized. This type of telescope system is well known in the art and no detailed description is necessary. It should also be apparent that any suitable type of telescope system may be utilized. Such telescopes are described, for example, in Section 178 and shown in FIGURE 237C of the book entitled Principles of Optics, by Hardy and Perrin, published by McGraw-Hill Co., 1932. Another suitable telescope is shown and described in FIGURES 6.19 and 6.20 and section 6.4 of the book entitled Principles of Optics, by Born and Wolfe, published by Pergamon Press, 1959.

After passing through the telescope system 212, the incident light passes through a motor driven chopper disc 186 and an entrance slit 187. The chopper 186, which is a rotating disc having one or more slots formed therein, "chops up" or modulates the light energy so that the outputs to the subsequent pickups will be alternating current electrical signals. The modulated light signal from the chopper 186 is then directed through an iris or shutter 180 which is under the control of an amplifier 196 and a servomotor 182. The iris 180 adjusts the intensity of the light impinging on a prism 188. The iris opening is controlled by the amplifier 196 and the servomotor 182 so that the incident light ray is normalized to a predetermined level before it is supplied to the remainder of the system. This is described in greater detail below. Servomotor 182 is a conventional type two way motor which drives the iris open or closed depending upon the signal applied thereto by amplifier 196.

After passing through the chopping disc 186 and the iris (shutter) 180, the light energy is split into the frequency components (spectral lines) of its characteristic frequency spectrum by the prism 188. Each of the frequency components is modulated, due to the action of the chopper 186. Many types of prisms are well known in the art which are capable of spreading out an incident ray of light energy into its characteristic spectrum. A suitable prism for accomplishing this is described at page 621 of the book entitled Physics, by Mausman and Slack, 3rd ed., 1944, which is published by D. Van Nostrand and Co. Other types of suitable prisms are also currently available on the market and therefore need no further description here. It should also be realized that a diffraction grating may be utilized, if desired, in place of the prism 188.

After the incident ray of energy is resolved into its characteristic spectrum by the prism 188, it is directed onto a bank of $n$ pickups 192a–192n. There are as many pickups 192 utilized as is consonant with the desired accuracy of the system. Each pickup 192 converts the modulated light energy of each of the frequency components from the prism 188 into an alternating current electrical signal. The magnitude of each alternating current signal is dependent upon the intensity of the particular spectral line in the light from the star which, in turn, is characteristic of the star itself.

The pickups 192 are each made to be responsive to one particular frequency, or range of frequencies of light, and located with respect to the prism 188 to receive that particular range from the prism. For example, pickups 192 may be a bank of photocells with a suitable fiter (not shown) placed in front of each photocell to make is sensitive only to the desired frequency component of the spectrum. The pickups 192 may also be formed of semiconductor material which has maximum sensitivity to a different range of frequencies of energy. Such light responsive pickups are well known in the art and are commercially available. Suitable types of light responsive pickups for use with the present system are also described in The Detection and Measurement of Infrared Radiation, by Smith, Jones and Chasmar, which is published by the Clarendon Press, Oxford, 1957. If the prism 188 and detectors 192 are properly oriented with respect to one another, it is possible to eliminate the filters, since the same color light is always emitted from the same point on the prism. However, in order to provide the greatest degree of accuracy, the filters are kept in place or else pickups 192 are made of materials selective to a single frequency or a narrow band or frequencies.

The alternating current output signal from each of the pickups 192a–192n is fed to the input of a respective amplifier 194, of conventional construction which amplifies the signal applied thereto. Suitable amplifiers are shown, for example in the publication by Smith, Jones and Chasmar referred to above. The alternating current output signal from each amplifier 194 is connected to the input of a respective detector (demodulator) 18. The demodulators 18 which, for example, may be conventional diode detectors or other similar circuits of the type which are illustratively shown in FIGURES 16–2 and 16–3 and described in sections 16–2 and 16–3 of the book entitled Electron Tube Circuits, by Seely, which is published by McGraw-Hill, 1950. These demodulators, as is well known, produce direct current voltage signals in response to the applied alternating current signals. These direct current signals are representative of the amplitudes of the frequency components supplied to the respective demodulators 18. It should be realized that there are as many amplifiers 194 and demodulators 18 as there are pickups 192 and that they are connected in channels for each frequency component.

The outputs of the detectors 18 are connected to a maximum voltage selection circuit 32. The circuit 32 selects the maximum amplitude direct current signal at the output of the detectors 18. This maximum amplitude signal is representative of the intensity of the maximum amplitude frequency component of the light spectrum. The maximum amplitude signal produced by the circuits 32 is used to control the opening of the iris 180 to normalize the intensity of the incident light ray so that an amplitude normalized signal is produced by the detectors 18. The maximum amplitude selecting circuit 32 may, for example as shown in FIGURE 2, be formed by a number of diodes which are backbiased by the other diodes of the circuit, so that only the diode at which the maximum amplitude signal appears is allowed to conduct. The signal which passes through the conducting diode is therefore representative of the amplitude of the maximum amplitude frequency component.

The amplitude selector circuit 32 supplies the signal which is representative of the maximum amplitude frequency component to a difference amplifier 54. The amplifier 54 may, for example, be a twin triode with common coupled cathodes. Another suitable type of difference amplifier is shown in FIGURE 15–22 of the book entitled Pulse and Digital Circuits, by Millman and Taub, McGraw-Hill, 1956. The difference amplifier 54 also receives a reference voltage signal from a reference source 36, which may be produced by a suitable battery, bias power supply, etc. The two signals are compared by the amplifier 54 and the signal produced by the comparison is used to control the iris 180 through the amplifier 196 and the servomotor 182. The reference voltage signal is set to provide an output signal from the difference amplifier 54 so that the iris 180 is opened to allow the correct amount of light to pass to the prism 188 so that a full scale digital reading is obtained for the maximum amplitude spectral frequency line of the spectrum. This is explained in detail below. The output signal from the amplifier 54 is of the proper magnitude and polarity to move the iris 180 in the correct direction to obtain this result.

The signal produced by the difference amplifier 54 normalizes the amplitude of the input light signal to the system by opening or closing iris 180, so that the maximum amplitude spectral line is converted into a direct current signal of a predetermined amplitude at its respective detector 18. The amplitudes of the direct current signals representative of the other spectral lines of the unknown spectrum are normalized accordingly. This enables the unknown spectrum to be compared to a standard spectrum since the unknown is normalized to a reference level. The normalization is accomplished by opening and closing the shutter 180, thereby controlling the intensity of the signal which is allowed to impinge upon the pickups 192. This controls the amplitude of the pickup output signals. This is accomplished by supplying the output signal from the difference amplifier 54 to a servo loop formed by a servo amplifier 196 and a servomotor 182. The servomotor 182 is driven in a direction, by the signal from the amplifier 54, so as to increase or decrease the opening of the shutter 180 in accordance with the magnitude and polarity of the signal at the output of the difference amplifier 54. This increases or decreases the intensity of the signal impinging on the pickups 192 and consequently the amplitudes of the signals detected by the maximum voltage selector circuit 32. In this manner, the amplitude of the incoming signal is mechanically normalized by means of the shutter 180 which is the controlled element of the servo loop. It should also be realized that electronic normalization can also be utilized, for example, by supplying a feedback signal to the pickups 192 to increase or decrease their sensitivity.

In order to compare the unknown spectrum received from a particular star to standard spectra, the voltages appearing at the output of the detectors 18a–18n are connected into digital (binary) numbers. The outputs of the detectors 18 are therefore respectively connected to an analog to digital converter 102. The converter 102 is actually a plurality of separate converters, one converter being provided for the output of each detector 18. Each of the converters may, for example, have four output lines on which a binary number, a series of binary 1's and 0's which are representative of the amplitudes of the signals applied from the detector 18, is produced. The converters 102 may have as many output lines as is commensurate with the number of binary digits into which it is desired to convert the voltage analog signal from the detector 18. The converters may be any suitable device which is capable of converting a voltage analog into a digital number. Any of the well known circuits suited to perform this function may be used, for example, the conversion devices which are discussed in Chapter 11 of the book "Digital Computer Components and Circuits," by Richards, published by Van Nostrand & Co., New York, 1957. Many suitable devices capable of performing this conversion are also commercially available, for example, the Multiverter, which is manufactured by Packard Bell Computer of Los Angeles, California.

It should be realized that the reference level signal from the reference source 36 is set to adjust the shutter 180, after comparison with the maximum amplitude signal selected by the circuit 32, so that a reference digital number is produced for the maximum amplitude frequency component. For example, if a four line output is used for the digital converter 102, the maximum amplitude frequency component may be adjusted so as to produce an output representative of the digital number 15— all binary 1's (1111). The frequency components of lesser amplitudes produce correspondingly smaller digital numbers, scaling down from the number 15 to digital zero (0000), which occurs in the absence of a signal on that particular channel. In this manner, a digital number is produced at the output of the converter 102. This number is representative of the amplitudes of the spectral lines forming the spectrum of the incoming light signal and is therefore representative of the star radiating the light.

After the number has been formed by the converter 102, it is compared in a logic circuit 115 with a plurality of reference numbers which are stored in a memory 120. The reference numbers in the memory 120 are representative of the spectra of known stars which have been previously resolved into the spectral lines of their characteristic amplitude-frequency spectra and have had digital numbers formed therefor, in accordance with the manner previously described. The memory 120, for example, may be a magnetic tape storage, punch cards, core matrix, etc.

A hold circuit 110 is provided at the output of the converter 102 so that the digital number formed at the converter's output is held for the length of time necessary to completely scan the memory 120. The hold circuit, for example, may be a number of relays which are connected to the output lines of the converters 102. The relays, which are bistable devices, in accordance with their position of set or reset, would then be representative of a binary 1 or a 0. It should also be realized, that other suitable hold circuits may be utilized, for example, semi-conductor or vacuum tube bistable circuits, magnetic cores, etc. Each of these devices may be reset after the memory has been completely scanned.

After the memory 120 is completely scanned, and no recognition is made, the hold circuit 110 is cleared to make way for a new digital number from the output of the converter 102 which is representative of the spectrum from another star. The "clear" signal is produced by the logic circuit 115, which contains suitable logic circuits to perform this operation, or else the "clear" signal may be made a part of the memory 120 so that it is produced after the last number of the memory is scanned.

When a recognition by the logic circuit 115 is made, meaning that the number produced by the converter 102, representative of the spectrum of the star, matches with one of the reference numbers on the memory 120, the logic circuit 115 produces a signal. The logic circuit 115 may, for example, be a suitable arrangement of "and" circuits which are connected in a well-known manner to produce a signal only when a match is exactly made or made within predetermined limits. Suitable circuits for performing the logic comparison operation are available commercially, for example, from Engineered Electronics Company of Santa Ana, California. This signal is first provided to the scan servo 206 to lock the mirror onto the particular star which was recognized. Such lock-on circuits are well known in the art, and are used, for example, in airborne radar fire control systems. Once the scanner servo 206 receives the lock-on signal from the logic circuit 115, the mirror 204 will track the star, regardless of any movement of the vehicle.

At the same time that the lock-on signal is provided, an enable signal is supplied to the vehicle's navigation computer 215. When the navigation computer 215 receives the enable signal it is then conditioned to receive the tracking information which is produced by the scanner servo 206. This information is the position of the mirror 204 with respect to the star which is being tracked by the scanner servo 206. This information may be produced by any suitable system such as azimuth and elevation resolvers and synchros. Such systems are also well known in the airborne radar fire control field.

The navigational computer 215 takes the position information from the scanner servo 206 and converts it into control signals, in accordance with a pre-set flight plan, which are used to steer the space vehicle. This may be accomplished by using the control signals to actuate suitable rudder and/or steering fins or by controlling the vehicle's main or auxiliary propulsion. For example, the signals from the navigational computer 215 may be utilized to operate auxiliary steering rockets on the vehicle. The auxiliary rockets would steer the vehicle on the pre-set course.

The system of the present invention has many uses, one such use being in the field of interplanetary navigation. As is well known, one of the more difficult problems encountered in interplanetary probes is that of guidance. Many systems of space guidance have been proposed. It is generally recognized that a single, ultra-precise guidance system for the entire course over which the vehicle is to navigate would be too costly and bulky.

Another system which can be used for space flight utilized three guidance stages. These are the initial phase, the mid-course phase and the terminal guidance phase. In practical use, the mid-course phase presents the most difficult guidance problem. One system for the mid-course guidance phase utilizes a self-contained vehicle tracking system, controlled by a gyro-stabilized platform, which would keep itself locked onto several stars for space fixed orientation. However, the gyro-stabilized system has several disadvantages. For example, consider what happens aboard a space ship somewhere in outer space, but within the solar system, when a momentary malfunction or displacement of the gyro-stabilized platform occurs. The immediate problem arises of how to re-orient the space ship, by means of the gyro's relationship to earth and determine its position in space. The system of the present invention needs no such re-orientation with respect to earth, since it is not at all dependent on gravity and/or the fixed reference of the earth's surface.

Other advantages of the present invention become more apparent when the general problem of navigation in space is considered. As is well known, surface navigation on the earth is accomplished by relating the directions and angular positions of selected starts to the direction of gravity. When on earth, the problem is only two-dimensional and a distance from the center of the earth does not have to be determined. In interplanetary flight, three coordinates of navigation must be utilized, including that of a distance with respect to a fixed body. In addition to the three coordinates, it is obvious that the force of gravity cannot be utilized. When navigating in space, measurement of the angular separations of the fixed stars among themselves is not sufficient to tell the space navigator where he is. This becomes apparent when it is considered that the total paralactic displacement for motion across the orbit of a planet like Mars is only about two seconds of arc for the very nearest fixed star. Therefore, by using the measurement of the angular separations of fixed stars, the desired degree of accuracy for space navigation cannot be obtained.

One navigational system which can be practiced utilizing the system of the present invention is set forth below. If it is considered that the stars are placed on the surface of an imaginary globe, which has as its center the center of the sun, and a plane of reference is selected which is the plane of the earth's orbit around the sun, the great circle which is the intersection of the extended plane of the earth's orbit with the celestial globe is called the ecliptic. The position of the space ship can be determined by its heliocentric longitude and latitude, according to the frame of reference, and its distance from the sun. If a specified axis within the guidance system of the space vehicle is always kept pointed to the sun, the direction of this axis can be used exactly as the direction of gravity is used in navigation on the surface of the earth. The angles made with this direction of the axis by the lines of two stars yield the ship's heliocentric latitude and longitude.

It should be realized that the actual position of the vehicle in space is not obtained until some distance to a fixed point is obtained. In a preferred system the distance to the sun is that which is utilized. One method of determining the distance from the vehicle to the sun is by measuring the sun's apparent size. This can be accomplished in the following manner. If an ordinary large focused image of the sun is obtained, say 10 inches in diameter, it is quite practical to photoelectrically measure the diameter of the sun to one part in four thousand. The sun's distance is then obtained with the same percentage accuracy with a relatively simple calculation. When, for example, the vehicle is at a distance to the sun equal to the distance from the sun to the planet Mars, the radial error amounts to only 40,000 miles or five times the earth's diameter. This degree of accuracy is adequate for the midcourse guidance phase and to within the last half million miles of the journey. At this point, if the vehicle was travelling to Mars, the apparent diameter of Mars would be about that of the apparent diameter of the moon as seen from the earth. At the one-half million miles point, the terminal phase guidance takes over and makes use of observations on Mars itself to guide the vehicle to a particular point.

Thus information is obtained by the system of the present invention, which gives the position of the vehicle in space. To determine the actual course of the vehicle to its destination, the star's heliocentric latitude and longitude and distance from the sun can be obtained from the ephemeris of the planet. The system of the present invention enables a space vehicle to determine its orientation automatically and with great ease. With the built-in storage of the spectra of many stars which are distributed over the entire sky, the system recognizes any start out of the many that are stored in the system's memory unit and thus aids in establishing or re-establishing the heliocentric latitude and longitude of the vehicle.

Another type of navigation which can be used with the system of the present invention is to provide the space vehicle with two tracking and recognition units. These two units simultaneously lock onto two stars and a simple telescope focused on the sun gives the distance of the vehicle from the sun. The tracking information from the two units is supplied to a computer which computes the position of the space vehicle. The destination of the vehicle having been previously programmed into the computer, the computer can now determine the required flight path based on the position of the vehicle, the orbit of the destination, and the dynamics of the space vehicle. The control data from the computer is then supplied to the servo control of the steering rocket which guides the vehicle into its intercept path.

Considering the sensitivity of the navigation system, consider that the unaided eye can see stars down to the sixth magnitude. To visualize how faint a star of this magnitude is, by comparison, the sun appears six trillion times as bright. The light that reaches the eye from a star of the sixth magnitude is only $10^{-11}$ lumens per square inch. This is a very small light intensity but modern photomultiplier tubes are capable of detecting light fluxes within the range of $10^{-13}$ to $10^{-14}$ lumens. Assuming a reduction of intensity of the order of 100 due to dispersion in the spectrum analysis system, the use of a 3-inch diameter telescope increases the light gathering ability of the system and enables light intensities well within the practical capabilities of the detection system to be obtained. There are approximately 50 stars of the order of the third magnitude or larger which are fairly evenly distributed over the heavens. By adjusting the telescope to have a threshold sensitivity for this magnitude star, for example, by providing a light filter, and restricting the field of the telescope to an angle of one degree, it is very likely that no more than one star will be scanned at any one time of this magnitude. If the spectra of these 50 stars are stored in the memory 120, a recognition can readily be accomplished. Even assuming a possibility that two stars are in the field of view of the telescope at the same time their spectra are not added directly but are offset. Therefore, the resultant spectrum will not be such as to give a false indication in the logic circuitry.

Utilizing the system shown in FIGURE 2, wherein the mirror 204 scans a cone having a vertex angle of 90°, the mechanics of the scanning system and recognition time of spectra analysis and memory system can be made to be approximately one minute. With a memory library of the spectra of 35 stars, and an average of 5 stars in each sector of the sky, the time required to establish a coordinate may be reduced to one-fifth of a minute.

Therefore, it is seen that a system has been described for use in the guidance of a space vehicle. The system of the present invention is not dependent upon gravity or upon the earth as a frame of reference and can locate itself automatically in space, even when the vehicle has lost its reference.

It should also be realized that the system of the present invention has many other uses. For example, it may be used for automatically positioning a terrestrial telescope and thereby overcome the difficult problem of locating a particular star in the heavens. This may be accomplished in much the same manner as space navigation, i.e., scanning the telescope by means of a servo system and stopping the telescope at the position where the particular star is identified. The system may also be used for the orientation of space satellites so that they are placed in their proper orbit. In this case, the signal from the logic circuits would control the release of the satellite from the upper propulsion stage of the rocket when the satellite is at a predetermined position with respect to a given star or stars and/or the signal used to control the firing of the satellite steering rockets or retro-rockets when the satellite is in orbit.

In view of the foregoing, in the light of the objectives of the invention, it will be apparent to those skilled in the art that the subject matter of this invention is capable of variation in its detail, and we do not, therefore, desire to be limited to the specific embodiment selected for purposes of explanation of the invention but only as required by the appended claims.

What is claimed is:

1. A system for the navigation of a vehicle in space comprising means on said vehicle for receiving the energies radiated by stars in space, means responsive to said received radiated energies for identifying various stars, and means responsive to the identification of various stars to navigate said vehicle in a desired manner.

2. A system for navigating a vehicle in space comprising means on said vehicle for receiving the energies radiated by stars in space, means connected to said receiving means for producing first signals representative of the location of said receiving means with respect to a reference location on said vehicle, means for identifying various stars by the characteristics of their radiated energies which are received and for producing a second signal when an identification is made, and means energized by a second signal for navigating said vehicle in response to said first signals.

3. A system for the navigation of a vehicle in space wherein stars exist which are identifiable by the type of radiation which they radiate comprising means on said vehicle for receiving said radiation; means for forming the characteristic spectrum of said received radiation; means for identifying said characteristic spectrum, and means for utilizing the identification of a star to steer said vehicle.

4. A system for the navigation of a vehicle in space wherein stars exist which are identifiable by the light which they radiate comprising means on said vehicle for receiving said light, means for forming the characteristic amplitude-frequency spectrum of said received light, means for identifying said characteristic amplitude-frequency spectrum, and means for utilizing the identification of a star to steer said vehicle.

5. A system for the navigation of a vehicle in space wherein stars exist which are identifiable by the light which they radiate comprising means on said vehicle for receiving said light, means for normalizing the intensity of the received light to a predetermined level, means for forming the characteristic amplitude-frequency spectrum of the normalized intensity light, means for identifying said characteristic amplitude-frequency spectrum, and means for utilizing the identification of a star to steer said vehicle.

6. A system for the navigation of a vehicle with relationship to space wherein stars exist which are identifiable by the light which they radiate comprising means on said vehicle for receiving said light, means for forming the characteristic amplitude-frequency spectrum of said received light, means for normalizing the amplitude of said spectrum, means for identifying said characteristic amplitude-frequency spectrum, and means for utilizing the identification of a star to steer said vehicle.

7. A system for the navigation of a vehicle with relationship to space wherein stars exist which are identifiable by the light which they radiate comprising means on said vehicle for receiving said light, means for forming the characteristic spectrum of said received light, means for normalizing the amplitude of said spectrum, means for forming a number which is representative of said spectrum, means for comparing said number with a plurality of reference numbers which are representative of known stars, means for indicating when said number is similar to one of said reference numbers thereby identifying the star from which the light was received, and means for utilizing the identification of a star to steer said vehicle.

8. A system for navigating a vehicle with relationship to space wherein stars exist which are identifiable by the light which they radiate comprising means on said vehicle scanning the space surrounding it for receiving the light radiated by the stars in space, means for forming the characteristic spectrum of the light received from each star, means for comparing each spectrum with a plurality of known spectra, means for indicating when the spectrum of a star matches a known spectrum thereby identifying the star, and means for utilizing the identification of said star for steering said vehicle.

9. A system for navigating a vehicle with relationship to space wherein stars exist which are identifiable by the light which they radiate comprising means on said vehicle scanning the space surrounding it for receiving the light radiated by the stars in space, means for forming the characteristic spectrum of the light received from each star, means for comparing each spectrum with a plurality of known spectra, means for indicating when the spectrum of a star matches a known spectrum thereby identifying the star, means responsive to the identification of a star for locking said scanning means onto the star which is identified, means for tracking said identified star when said scanning means is locked onto it, said last named means also producing information of the relationship of the vehicle with respect to the identified star.

10. A system for the navigation of a vehicle with relationship to space wherein stars exist which are identifiable by the light which they radiate comprising means on said vehicle scanning the space around it for receiving the light radiated by the stars in space, means for forming the characteristic amplitude-frequency spectrum of the light received from each star, means for normalizing the amplitude of each said spectrum to a predetermined reference level, means for forming a number which is representative of each said spectrum, means for comparing each number so formed with a plurality of reference numbers which are representative of known stars, means for indicating when said number is similar to one of said reference numbers thereby identifying the star from which the light was received, and means for utilizing the identification of said star for steering said vehicle.

11. A system as set forth in claim 10 wherein said scanning means includes a mirror.

12. A system for the navigation of a vehicle with relationship to space wherein stars exist which are identifiable by the light which they radiate comprising means on said vehicle scanning the space around it for receiving the light radiated by the stars in space, means for forming the characteristic amplitude-frequency spectrum of the light received from each star, means for normalizing the amplitude of each said spectrum to a predetermined reference level, means for forming a number which is representative of each said spectrum, means for comparing each number so formed with a plurality of reference numbers which are representative of known stars, means for indicating when said number is similar to one of said reference numbers thereby identifying the star from which the light was received, means responsive to the identification of a star for locking said scanning means onto the star which is identified, means for tracking said identified star when said scanning means is locked onto it, said last named means also producing information of the relationship of the vehicle with respect to the identified star.

13. A system for the navigation of a vehicle with relationship to space wherein stars exist which are identifiable by the light which they radiate comprising means on said vehicle scanning the space around it for receiving the light radiated by the stars in space, means for forming the spectrum of the light received from each star, said last named means including means for forming the frequency dispersion pattern of the received light, means for forming signals which are representative of each spectrum, an adjustable iris interposed between said light receiving means and said signal forming means for controlling the amount of light applied to said signal forming means so that said signals are normalized in amplitude, means for identifying said signals thereby identifying the stars from which the light was radiated, and means for utilizing the identification to steer said vehicle.

14. A system as set forth in claim 13 wherein said means for forming the frequency dispersion pattern includes a prism.

15. A system as set forth in claim 13 wherein said means for forming the frequency dispersion pattern includes a diffraction grating.

16. A system for the navigation of a vehicle with relationship to space wherein stars exist which are identifiable by the light which they radiate comprising means on said vehicle scanning the space around it for receiving the light radiated by the stars in space, means for forming the spectrum of the light received from each star, said last named means including means for forming the frequency dispersion pattern of the received light, means for forming signals which are representative of each spectrum, an adjustable iris interposed between said light receiving means and said signal forming means for controlling the amount of light applied to said signal forming means so that said signals are normalized in amplitude, means for identifying said signals thereby identifying the stars from which the light was radiated, means responsive to the identification of a star for locking said scanning means onto the star which is identified, means for tracking said identified star when said scanning means is locked onto it, said last named means also producing information of the relationship of the vehicle with respect to the identified star.

17. A system for navigating a vehicle in space comprising movable means on said vehicle for receiving the radiant energies produced by stars in space, means connected to said movable means for producing first signals representative of the location of said movable means with respect to a reference location on said vehicle, means responsive to the received radiated energies for identifying various stars by the characteristics of their radiated energies and for producing a second signal when an identification is made, and means energized by a second signal for navigating and guiding said vehicle in response to said first signals.

References Cited in the file of this patent

UNITED STATES PATENTS

| | | |
|---|---|---|
| 2,866,899 | Busignies et al. | Dec. 30, 1958 |
| 2,930,545 | Houle et al. | Mar. 29, 1960 |
| 3,060,790 | Ward | Oct. 30, 1962 |